United States Patent
Maxik et al.

(10) Patent No.: US 9,036,868 B2
(45) Date of Patent: May 19, 2015

(54) SUSTAINABLE OUTDOOR LIGHTING SYSTEM FOR USE IN ENVIRONMENTALLY PHOTO-SENSITIVE AREA

(71) Applicant: Biological Illumination, LLC, Satellite Beach, FL (US)

(72) Inventors: Fredric S. Maxik, Cocoa Beach, FL (US); David E. Bartine, Cocoa, FL (US); Robert R. Soler, Cocoa Beach, FL (US); Valerie Ann Bastien, Melbourne, FL (US); James Lynn Schellack, Skiatook, OK (US); Eliza Katar Grove, Satellite Beach, FL (US)

(73) Assignee: Biological Illumination, LLC, Melbourne, FL (US)

( * ) Notice: Subject to any disclaimer, the term of this patent is extended or adjusted under 35 U.S.C. 154(b) by 0 days.

(21) Appl. No.: 14/271,540

(22) Filed: May 7, 2014

(65) Prior Publication Data
US 2014/0239820 A1 Aug. 28, 2014

Related U.S. Application Data

(63) Continuation of application No. 13/715,085, filed on Dec. 14, 2012, now Pat. No. 8,761,447, which is a continuation of application No. 12/942,875, filed on Nov. 9, 2010, now Pat. No. 8,401,231.

(51) Int. Cl.
*G06K 9/00* (2006.01)
*H05B 37/02* (2006.01)
*H05B 33/08* (2006.01)

(52) U.S. Cl.
CPC ............. *H05B 37/0227* (2013.01); *Y02B 20/72* (2013.01); *H05B 33/0854* (2013.01)

(58) Field of Classification Search
None
See application file for complete search history.

(56) References Cited

U.S. PATENT DOCUMENTS 5,523,878 A 6/1996 Wallace et al.
5,680,230 A 10/1997 Kaburagi et al.
(Continued)

FOREIGN PATENT DOCUMENTS

CN 101 702 421 A 5/2010
EP 0851260 7/1998
(Continued)

OTHER PUBLICATIONS

Kiyoshi et al., Translation of JP Publication JP2008-226567, Streetlamp, Originally Published Sep. 25, 2008, Translation obtained by Patent Abstracts of Japan (PAJ), Date Accessed Nov. 2, 2012, Available online: http://www19.ipdl.inpit.go.jp/PA1/cgi-bin/PA1DETAIL.*

(Continued)

*Primary Examiner* — Tahmina Ansari
(74) *Attorney, Agent, or Firm* — Mark R. Malek; Daniel C. Pierron; Widerman Malek, PL

(57) ABSTRACT

Provided herein are systems and methods for outdoor lighting, which generally include two or more light sources. One light source is a monochromatic light source producing a light with a peak wavelength of about 580 nm or above. A second light source is a polychromatic light source producing a green-tint white light. During a standby operational mode, a control system maintains the first light source illuminated. The control system, which includes an integrated imaging system, illuminates the second light source when the imaging system identifies a target in an illumination area. Methods of preparing and using such outdoor lighting system are also provided.

20 Claims, 6 Drawing Sheets

(56) References Cited

U.S. PATENT DOCUMENTS

| | | | |
|---|---|---|---|
| 5,704,701 | A | 1/1998 | Kavanagh et al. |
| 5,813,753 | A | 9/1998 | Vriens et al. |
| 5,997,150 | A | 12/1999 | Anderson |
| 6,140,646 | A | 10/2000 | Busta et al. |
| 6,259,572 | B1 | 7/2001 | Meyer, Jr. |
| 6,341,876 | B1 | 1/2002 | Moss et al. |
| 6,356,700 | B1 | 3/2002 | Strobl |
| 6,561,656 | B1 | 5/2003 | Kojima et al. |
| 6,586,882 | B1 | 7/2003 | Harbers |
| 6,594,090 | B2 | 7/2003 | Kruschwitz et al. |
| 6,733,135 | B2 | 5/2004 | Dho |
| 6,734,639 | B2 | 5/2004 | Chang et al. |
| 6,762,562 | B2 | 7/2004 | Leong |
| 6,767,111 | B1 | 7/2004 | Lai |
| 6,817,735 | B2 | 11/2004 | Shimizu et al. |
| 6,870,523 | B1 | 3/2005 | Ben-David et al. |
| 6,871,982 | B2 | 3/2005 | Holman et al. |
| 6,940,101 | B2 | 9/2005 | Yano et al. |
| 6,967,761 | B2 | 11/2005 | Starkweather et al. |
| 6,974,713 | B2 | 12/2005 | Patel et al. |
| 7,015,636 | B2 | 3/2006 | Bolta |
| 7,042,623 | B1 | 5/2006 | Huibers et al. |
| 7,058,197 | B1 | 6/2006 | McGuire et al. |
| 7,070,281 | B2 | 7/2006 | Kato |
| 7,072,096 | B2 | 7/2006 | Holman et al. |
| 7,075,707 | B1 | 7/2006 | Rapaport et al. |
| 7,083,304 | B2 | 8/2006 | Rhoads |
| 7,095,053 | B2 | 8/2006 | Mazzochette et al. |
| 7,144,131 | B2 | 12/2006 | Rains |
| 7,157,745 | B2 | 1/2007 | Blonder et al. |
| 7,178,941 | B2 | 2/2007 | Roberge et al. |
| 7,184,201 | B2 | 2/2007 | Duncan |
| 7,187,484 | B2 | 3/2007 | Mehrl |
| 7,213,926 | B2 | 5/2007 | May et al. |
| 7,234,844 | B2 | 6/2007 | Bolta et al. |
| 7,246,923 | B2 | 7/2007 | Conner |
| 7,247,874 | B2 | 7/2007 | Bode et al. |
| 7,252,408 | B2 | 8/2007 | Mazzochette et al. |
| 7,255,469 | B2 | 8/2007 | Wheatley et al. |
| 7,261,453 | B2 | 8/2007 | Morejon et al. |
| 7,289,090 | B2 | 10/2007 | Morgan |
| 7,300,177 | B2 | 11/2007 | Conner |
| 7,303,291 | B2 | 12/2007 | Ikeda et al. |
| 7,319,293 | B2 | 1/2008 | Maxik |
| 7,325,956 | B2 | 2/2008 | Morejon et al. |
| 7,342,658 | B2 | 3/2008 | Kowarz et al. |
| 7,344,279 | B2 | 3/2008 | Mueller et al. |
| 7,349,095 | B2 | 3/2008 | Kurosaki |
| 7,353,859 | B2 | 4/2008 | Stevanovic et al. |
| 7,369,056 | B2 | 5/2008 | McCollough, Jr. |
| 7,382,091 | B2 | 6/2008 | Chen |
| 7,382,632 | B2 | 6/2008 | Alo et al. |
| 7,400,439 | B2 | 7/2008 | Holman |
| 7,427,146 | B2 | 9/2008 | Conner |
| 7,429,983 | B2 | 9/2008 | Islam |
| 7,434,946 | B2 | 10/2008 | Huibers |
| 7,436,996 | B2 | 10/2008 | Ben-Chorin |
| 7,438,443 | B2 | 10/2008 | Tatsuno et al. |
| 7,476,016 | B2 | 1/2009 | Kurihara |
| 7,497,596 | B2 | 3/2009 | Ge |
| 7,520,607 | B2 | 4/2009 | Casper et al. |
| 7,520,642 | B2 | 4/2009 | Holman et al. |
| 7,521,875 | B2 | 4/2009 | Maxik |
| 7,528,421 | B2 | 5/2009 | Mazzochete |
| 7,530,708 | B2 | 5/2009 | Park |
| 7,537,347 | B2 | 5/2009 | Dewald |
| 7,540,616 | B2 | 6/2009 | Conner |
| 7,556,376 | B2 | 7/2009 | Ishak et al. |
| 7,556,406 | B2 | 7/2009 | Petroski et al. |
| 7,598,686 | B2 | 10/2009 | Lys et al. |
| 7,598,961 | B2 | 10/2009 | Higgins |
| 7,605,971 | B2 | 10/2009 | Ishii et al. |
| 7,619,372 | B2 | 11/2009 | Garrity |
| 7,626,755 | B2 | 12/2009 | Furuya et al. |
| 7,633,093 | B2 | 12/2009 | Blonder et al. |
| 7,633,779 | B2 | 12/2009 | Garrity et al. |
| 7,637,643 | B2 | 12/2009 | Maxik |
| 7,677,736 | B2 | 3/2010 | Kazasumi et al. |
| 7,679,281 | B2 | 3/2010 | Kim et al. |
| 7,684,007 | B2 | 3/2010 | Hull et al. |
| 7,703,943 | B2 | 4/2010 | Li et al. |
| 7,705,810 | B2 | 4/2010 | Choi et al. |
| 7,708,452 | B2 | 5/2010 | Maxik et al. |
| 7,709,811 | B2 | 5/2010 | Conner |
| 7,719,766 | B2 | 5/2010 | Grasser et al. |
| 7,728,846 | B2 | 6/2010 | Higgins et al. |
| 7,732,825 | B2 | 6/2010 | Kim et al. |
| 7,766,490 | B2 | 8/2010 | Harbers et al. |
| 7,819,556 | B2 | 10/2010 | Heffington et al. |
| 7,828,453 | B2 | 11/2010 | Tran et al. |
| 7,828,465 | B2 | 11/2010 | Roberge et al. |
| 7,832,878 | B2 | 11/2010 | Brukilacchio et al. |
| 7,834,867 | B2 | 11/2010 | Sprague et al. |
| 7,835,056 | B2 | 11/2010 | Doucet et al. |
| 7,841,714 | B2 | 11/2010 | Grueber |
| 7,845,823 | B2 | 12/2010 | Mueller et al. |
| 7,855,376 | B2 | 12/2010 | Cantin et al. |
| 7,871,839 | B2 | 1/2011 | Lee |
| 7,880,400 | B2 | 2/2011 | Zhoo et al. |
| 7,889,430 | B2 | 2/2011 | El-Ghoroury et al. |
| 7,906,789 | B2 | 3/2011 | Jung et al. |
| 7,928,565 | B2 | 4/2011 | Brunschwiler et al. |
| 7,964,883 | B2 | 6/2011 | Mazzochete et al. |
| 7,972,030 | B2 | 7/2011 | Li |
| 7,976,182 | B2 | 7/2011 | Ribarich |
| 7,976,205 | B2 | 7/2011 | Grotsch et al. |
| 8,016,443 | B2 | 9/2011 | Falicoff et al. |
| 8,040,070 | B2 | 10/2011 | Myers et al. |
| 8,047,660 | B2 | 11/2011 | Penn et al. |
| 8,049,763 | B2 | 11/2011 | Kwak et al. |
| 8,061,857 | B2 | 11/2011 | Liu et al. |
| 8,070,302 | B2 | 12/2011 | Hatanaka et al. |
| 8,076,680 | B2 | 12/2011 | Lee et al. |
| 8,083,364 | B2 | 12/2011 | Allen |
| 8,096,668 | B2 | 1/2012 | Abu-Ageel |
| 8,115,419 | B2 | 2/2012 | Given et al. |
| 8,164,844 | B2 | 4/2012 | Toda et al. |
| 8,182,115 | B2 | 5/2012 | Takahashi et al. |
| 8,188,687 | B2 | 5/2012 | Lee et al. |
| 8,192,047 | B2 | 6/2012 | Bailey et al. |
| 8,212,836 | B2 | 7/2012 | Matsumoto et al. |
| 8,242,476 | B2 | 8/2012 | Memeault et al. |
| 8,253,336 | B2 | 8/2012 | Maxik et al. |
| 8,256,921 | B2 | 9/2012 | Crookham et al. |
| 8,274,089 | B2 | 9/2012 | Lee |
| 8,297,783 | B2 | 10/2012 | Kim |
| 8,304,978 | B2 | 11/2012 | Kim et al. |
| 8,310,171 | B2 | 11/2012 | Reisenauer et al. |
| 8,319,445 | B2 | 11/2012 | McKinney et al. |
| 8,324,823 | B2 | 12/2012 | Choi et al. |
| 8,324,840 | B2 | 12/2012 | Shteynberg et al. |
| 8,331,099 | B2 | 12/2012 | Geissler et al. |
| 8,337,029 | B2 | 12/2012 | Li |
| 8,378,574 | B2 | 2/2013 | Schlangen et al. |
| 8,384,984 | B2 | 2/2013 | Maxik et al. |
| 8,401,231 | B2 | 3/2013 | Maxik et al. |
| 8,405,299 | B2 | 3/2013 | Toda et al. |
| 8,410,717 | B2 | 4/2013 | Shteynberg et al. |
| 8,410,725 | B2 | 4/2013 | Jacobs et al. |
| 8,427,590 | B2 | 4/2013 | Raring et al. |
| 8,441,210 | B2 | 5/2013 | Shteynberg et al. |
| 8,456,323 | B2 | 6/2013 | Hou et al. |
| 8,465,167 | B2 | 6/2013 | Maxik et al. |
| 8,531,126 | B2 | 9/2013 | Kaihotsu et al. |
| 8,547,391 | B2 | 10/2013 | Maxik et al. |
| 8,662,672 | B2 | 3/2014 | Hikmet et al. |
| 8,674,613 | B2 | 3/2014 | Gray et al. |
| 8,678,787 | B2 | 3/2014 | Hirata et al. |
| 8,680,457 | B2 | 3/2014 | Maxik et al. |
| 8,686,641 | B2 | 4/2014 | Maxik et al. |
| 8,733,949 | B2 | 5/2014 | Chong et al. |
| 8,760,370 | B2 | 6/2014 | Maxik et al. |
| 8,761,447 | B2 | 6/2014 | Maxik et al. |
| 8,770,773 | B2 | 7/2014 | Yoshida |

(56) References Cited

U.S. PATENT DOCUMENTS

| | | | |
|---|---|---|---|
| 8,770,821 B2 | 7/2014 | Ijzerman et al. | |
| 8,803,166 B2 | 8/2014 | Lin et al. | |
| 2004/0052076 A1 | 3/2004 | Mueller et al. | |
| 2005/0218780 A1 | 10/2005 | Chen | |
| 2005/0267213 A1 | 12/2005 | Gold et al. | |
| 2006/0002108 A1 | 1/2006 | Ouderkirk et al. | |
| 2006/0002110 A1 | 1/2006 | Dowling et al. | |
| 2006/0164005 A1 | 7/2006 | Sun | |
| 2006/0285193 A1 | 12/2006 | Kimura et al. | |
| 2007/0013871 A1 | 1/2007 | Marshall et al. | |
| 2007/0159492 A1 | 7/2007 | Lo et al. | |
| 2007/0228262 A1* | 10/2007 | Cantin et al. | 250/221 |
| 2007/0262714 A1 | 11/2007 | Bylsma | |
| 2008/0119912 A1 | 5/2008 | Hayes | |
| 2008/0143973 A1 | 6/2008 | Wu | |
| 2008/0198572 A1 | 8/2008 | Medendorp | |
| 2008/0232084 A1 | 9/2008 | Kon | |
| 2009/0059585 A1 | 3/2009 | Chen et al. | |
| 2009/0128781 A1 | 5/2009 | Li | |
| 2009/0273931 A1 | 11/2009 | Ito et al. | |
| 2010/0001652 A1 | 1/2010 | Damsleth | |
| 2010/0006762 A1 | 1/2010 | Yoshida et al. | |
| 2010/0051976 A1 | 3/2010 | Rooymans | |
| 2010/0103389 A1 | 4/2010 | McVea et al. | |
| 2010/0202129 A1 | 8/2010 | Abu-Ageel | |
| 2010/0244740 A1 | 9/2010 | Alpert et al. | |
| 2010/0265083 A1* | 10/2010 | Hou et al. | 340/686.6 |
| 2010/0270942 A1 | 10/2010 | Hui et al. | |
| 2010/0277084 A1 | 11/2010 | Lee et al. | |
| 2010/0315252 A1* | 12/2010 | Desphande et al. | 340/670 |
| 2010/0321641 A1 | 12/2010 | Van Der Lubbe | |
| 2011/0080635 A1 | 4/2011 | Takeuchi | |
| 2011/0310446 A1 | 12/2011 | Komatsu | |
| 2014/0015438 A1 | 1/2014 | Maxik et al. | |

FOREIGN PATENT DOCUMENTS

| | | | |
|---|---|---|---|
| JP | 2008-226567 | * | 9/2008 |
| JP | 2008226567 | | 9/2008 |
| WO | WO03098977 | | 11/2003 |
| WO | WO2004011846 A1 | | 2/2004 |
| WO | WO2009121539 A1 | | 10/2009 |
| WO | WO 2012064470 | | 5/2012 |
| WO | WO2012135173 | | 10/2012 |
| WO | WO2012158665 | | 11/2012 |

OTHER PUBLICATIONS

Arthur P. Fraas, Heat Exchanger Design, 1989, p. 60, John Wiley & Sons, Inc., Canada.
Binnie et al. (1979) "Fluorescent Lighting and Epilepsy" Epilepsia 20(6):725-727.
Charamisinau et al. (2005) "Semiconductor laser insert with Uniform Illumination for Use in Photodynamic Therapy" Appl Opt 44(24):5055-5068.
Erba Shedding Light on Photosensitivity, One of Epilepsy's Most Complex Conditions. Photosensitivity and Epilepsy. Epilepsy Foundation. Accessed: Aug. 28, 2009. http://www.epilepsyfoundation.org/aboutepilepsy/seizures/photosensitivity-/gerba.cfm.
Figueiro et al. (2004) "Spectral Sensitivity of the Circadian System" Proc. SPIE 5187:207.
Figueiro et al. (2008) "Retinal Mechanisms Determine the Subadditive Response to Polychromatic Light by the Human Circadian System" Neurosci Lett 438(2):242.
Gabrecht et al. (2007) "Design of a Light Delivery System for the Photodynamic Treatment of the Crohn's Disease" Proc. SPIE 6632:1-9.
Glenn Elert, The Physics Hypertextbook, 1998-2013, Date Accessed Sep. 17, 2013, Available online at http://physics.info/color/.
H. A El-Shaikh, S. V. Garimella, "Enhancement of Air Jet Impingement Heat Transfer using Pin-Fin Heat Sinks", D IEEE Transactions on Components and Packaging Technology, Jun. 2000, vol. 23, No. 2.
Happawana et al. (2009) "Direct De-Ionized Water-Cooled Semiconductor Laser Package for Photodynamic Therapy of Esophageal Carcinoma: Design and Analysis" J Electron Pack 131(2):1-7.
Harding & Harding (1999) "Televised Material and Photosensitive Epilepsy" Epilepsia 40(Suppl. 4):65.
International Search Report for International Application No. PCT/US2011/056781, dated May 17, 2012.
Jones, Eric D., Light Emitting Diodes (LEDS) for General Lumination, an Optoelectronics Industry Development Association (OIDA) Technology Roadmap, OIDA Report, Mar. 2001, published by OIDA in Washington D.C.
J. Y. San, C. H. Huang, M. H, Shu, "Impingement cooling of a confined circular air jet", In t. J. Heat Mass Transf., 1997. pp. 1355-1364, vol. 40.
Kiyoshi et al., JP Publication—JP2008-226567, Streetlamp, Published Sep. 25, 2008.
Kuller & Laike (1998) "The Impact of Flicker from Fluorescent Lighting on Well-Being, Performance and Physiological Arousal" Ergonomics 41(4):433-447.
Lakatos (2006) "Recent trends in the epidemiology of Inflammatory Bowel Disease: Up or Down?" World J Gastroenterol 12(38):6102.
N. T. Obot, W. J. Douglas, A S. Mujumdar, "'Effect of Semi-confinement on Impingement Heat Transfer", Proc. 7th Int. Heat Transf. Conf., 1982, pp. 1355-1364. vol. 3.
Ortner & Dorta (2006) "Technology Insight: Photodynamic Therapy for Cholangiocarcinoma" Nat Clin Pract Gastroenterol Hepatol 3(8):459-467.
Rea (2010) "Circadian Light" J Circadian Rhythms 8(1):2.
Rea et al. (2010) "The Potential of Outdoor Lighting for Stimulating the Human Circadian System" Alliance for Solid-State Illumination Systems and Technologies (ASSIST), May 13, 2010, p. 1-11.
Rosco Laboratories Poster "Color Filter Technical Data Sheet: #87 Pale Yellow Green" (2001).
S. A Solovitz, L. D. Stevanovic, R. A Beaupre, "Microchannels Take Heatsinks to the Next Level", Power Electronics Technology, Nov. 2006.
Stevens (1987) "Electronic Power Use and Breast Cancer: A Hypothesis" Am J Epidemiol 125(4):556-561.
Tannith Cattermole, "Smart Energy Class controls light on demand", Gizmag.com, Apr. 18, 2010 accessed Nov. 1, 2011.
Topalkara et al. (1998) "Effects of flash frequency and repetition of intermittent photic stimulation on photoparoxysmal responses" Seizure 7(13):249-253.
Veitch & McColl (1995) "Modulation of Fluorescent Light: Flicker Rate and Light Source Effects on Visual Performance and Visual Comfort" Lighting Research and Technology 27:243-256.
Wang (2005) "The Critical Role of Light in Promoting Intestinal Inflammation and Crohn's Disease" J Immunol 174(12):8173-8182.
Wilkins et al. (1979) "Neurophysical aspects of pattern-sensitive epilepsy" Brain 102:1-25.
Wilkins et al. (1989) "Fluorescent lighting, headaches, and eyestrain" Lighting Res Technol 21(1):11-18.
Yongmann M. Chung, Kai H. Luo, "Unsteady Heat Transfer Analysis of an Impinging Jet", Journal of Heat Transfer—Transactions of the ASME, Dec. 2002, pp. 1039-1048, vol. 124, No. 6.

* cited by examiner

SUSTAINABLE OUTDOOR LIGHTING SYSTEM FOR USE IN ENVIRONMENTALLY PHOTO-SENSITIVE AREA

RELATED APPLICATIONS

This application is a continuation and claims the benefit under 35 U.S.C. §120 of U.S. patent application Ser. No. 13/715,085 titled Sustainable Outdoor Lighting System For Use In Environmentally Photo-Sensitive Area filed Dec. 12, 2012, which, in turn, is a continuation of U.S. patent application Ser. No. 12/942,875 titled Sustainable Outdoor Lighting System For Use In Environmentally Photo-Sensitive Area filed Nov. 9, 2010, now U.S. Pat. No. 8,401,231 issued Mar. 19, 2013, the contents of each of which are incorporated in their entireties herein.

FIELD OF THE INVENTION

The present invention relates to systems and methods for generating light. More specifically, the present invention relates to an outdoor lighting system for use in environmentally photo-sensitive areas.

BACKGROUND OF THE INVENTION

Outdoor lighting systems have commonly been used to illuminate streets, parking lots, sidewalks, parks, and other public areas. However, many outdoor lighting systems result in unwanted glare, light trespass, energy waste, sky glow, and other generally unwanted light pollution. Many outdoor lighting systems also produce spectral pollution; i.e., unwanted or hazardous effects resulting from the color spectrum emitted from the lighting system. Amongst other things, spectral pollution can have detrimental environmental effects on plant and animal species; for example, nocturnal mammals, migratory birds, and sea turtles. Roadway lighting and security lighting along the coastline of Florida, for example, have been shown to result in sometimes catastrophic reductions in the breeding success of several species of sea turtles. For example, certain lights can inhibit adult female turtles from coming ashore to lay their eggs, and also lure newly hatched turtles inland rather than to the open sea.

The American Astronomical Society and the International Astronomical Union recommend several solutions for alleviating light pollution or light trespass. The recommendations include controlling the emitted light via light fixture design and placement, taking advantage of timers and occupancy sensors, using ultraviolet and infrared filters to remove non-visible radiation, and using monochromatic light sources such as low-pressure sodium (LPS) lamps for roadway, parking lot, and security lighting. Unfortunately, the recommendations each have their limitations and disadvantages. For example, while the use of an amber monochromatic light may minimize unwanted environmental effects, amber monochromatic light compromises color rendering and provides inadequate viewing conditions for certain mission-critical circumstances. Further, solutions for alleviating light pollution or light trespass are not always effective in alleviating spectral pollution.

What is needed is a lighting system that is efficient, cost-effective, and minimizes spectral pollution, while providing adequate lighting and color rendering for varying circumstances.

SUMMARY OF THE INVENTION

Provided herein are outdoor lighting systems and methods to address the above-identified problems. In general, the embodiments provided herein include an environmentally sensitive outdoor lighting system comprising a first light source that may produce monochromatic light, a second light source that may produce a polychromatic white light, a control system that may be electrically coupled to the first light source and the second light source, and an imaging systems that may be integrated with the control system and may provide an input to the control system. The imaging system may comprise a processor having image-recognition logic to differentiate between a target and another non-target moving object. Additionally, the control system may be programmed to illuminate the first light source in a standby operational mode, and illuminate the second light source when the imaging system detects a target within an illumination area.

In some embodiments, the second light source may produce light with a color rendering index of 75 or above. Additionally, the first light source may have a peak wavelength above 580 nm. Furthermore, the first light source may produce lighting with a peak wavelength within one of the ranges selected from the group consisting of: from 580 nm to 660 nm, from 580 nm to 615 nm, and from 580 nm to 600 nm. The first light source may be selected from the group consisting of: an LED light source, a low-pressure sodium light source, and an amber light source. Additionally, the second light source may produce a polychromatic green-tint white light.

In some embodiments, the imaging system comprises at least one of a COD camera and a CMOS image sensor. Furthermore, the control system may be programmed to illuminate the first light source in a standby operation mode and maintain the second light source un-illuminated, despite detecting a target, during an environmentally critical time period. Additionally, the lighting system may further comprise a communications module coupled to the control system. The communication module may provide external commands to the control system.

Methods of preparing and using such outdoor lighting system are also provided.

BRIEF DESCRIPTION OF THE DRAWINGS

The accompanying drawings, which are incorporated herein, form part of the specification. Together with this written description, the drawings further serve to explain the principles of, and to enable a person skilled in the relevant art(s), to make and use an outdoor lighting system in accordance with the present invention. In the drawings, like reference numbers indicate identical or functionally similar elements.

DETAILED DESCRIPTION

The following detailed description of the figures refers to the accompanying drawings that illustrate one or more exemplary embodiments of an outdoor lighting system. Other embodiments are possible. Modifications may be made to the embodiment described herein without departing from the spirit and scope of the present invention. Therefore, the following detailed description is not meant to be limiting.

Before describing one or more embodiments in detail, it is useful to provide definitions for key terms and concepts used herein. For example, for a target to "enter" or be "within" an illumination area does not imply that the target is inside the absolute boundary of the illumination area. The terms "enter" and "within," in the context of the present invention, should be broadly construed to include situations wherein the target is in the vicinity of the illumination area. Further, the term "monochromatic light" is intended to mean "a light having a half-peak spectral bandwidth of less than about 25 nm." An "amber light" is "a monochromatic light having a peak wavelength between about 580 nm and about 660 nm," The term "polychromatic light" is intended to mean "a light having a half-peak spectral bandwidth of more than about 25 nm, or a light with two or more spectral peaks." Further, the term "standby operational mode" is intended to mean "a condition in which the lighting system is illuminating an illumination area, but circumstances are such that environmental impact need not be compromised for adequate color rendering." For example, if there are no targets (e.g., humans or vehicles) in the vicinity of the illumination area, the outdoor lighting system may be maintained in a standby operational mode because adequate color rendering is of little or no concern.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either or both of those included limits are also included in the disclosure.

Figure 1:
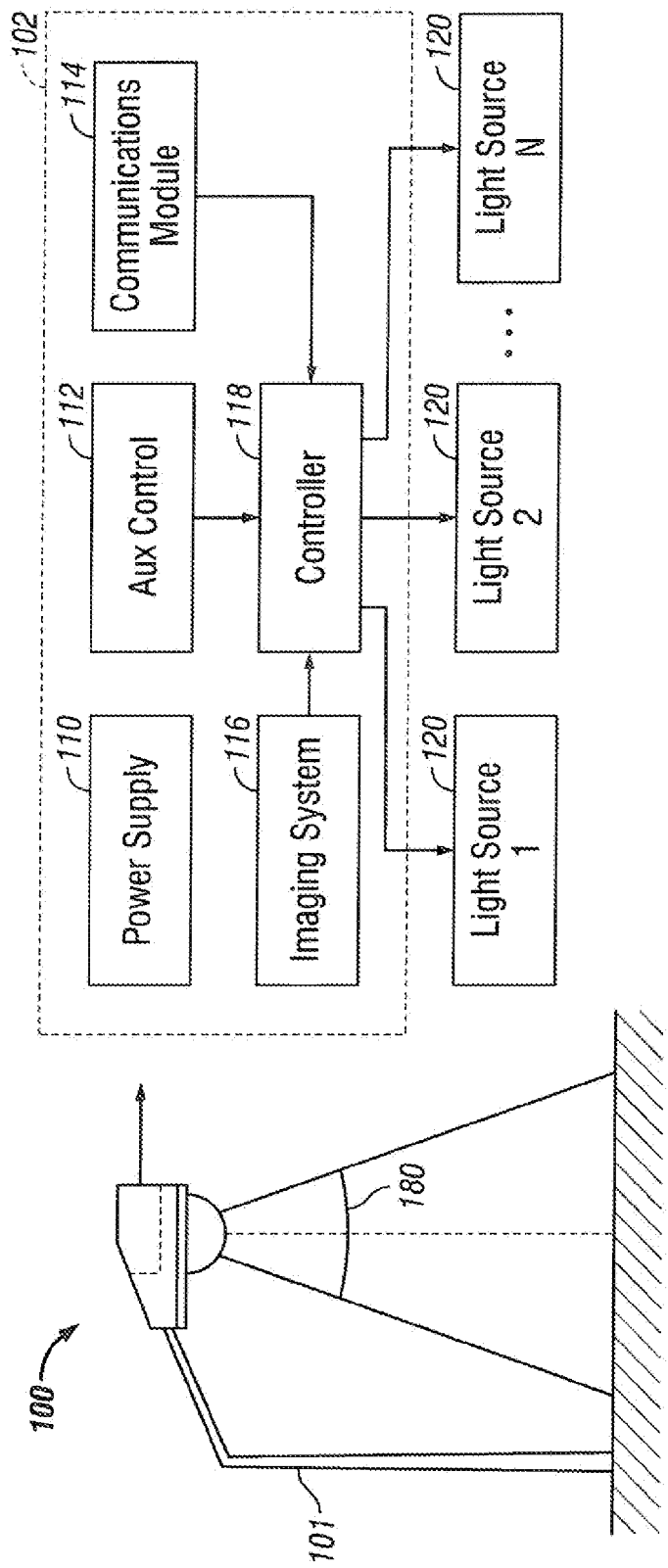
FIG. 1 is schematic illustration of one embodiment of the present invention.

FIG. 1 is schematic illustration of one embodiment presented herein, FIG. 1 illustrates an outdoor lighting system 100 incorporated into a street lamp 101. The positioning and optics provided in lighting system 100 create an illumination area 180. In alternative embodiments, the methods and systems described herein may be incorporated into various lighting fixtures, forms, and configurations. For example, the methods and systems described herein may be incorporated into a light fixture as described in U.S. Patent Application Publication No. 201010188850, the entire disclosure of which is herein incorporated by reference. The methods and systems described herein may also be incorporated into fixtures other than an outdoor street lamp.

As further outlined below, lighting system 100 is configured to be switched between providing monochromatic light under a standby operational mode, and polychromatic light when a target enters illumination area 180. As such lighting system 100 minimizes environmental disturbance and spectral pollution when in a standby operational mode. However, when a target (e.g., a human or vehicle) enters illumination area 180, or under other mission-critical situations, lighting system 100 provides a polychromatic, high color rendering light. As such, during a mission-critical situation, lighting system 100 compromises environmental impact for optimal viewing conditions.

In one embodiment, lighting system 100 includes internal components as illustrated in the block 102. For example, lighting system 100 includes a power supply 110, auxiliary control 112, communications module 114, imaging system 116, controller 118, and the plurality of light sources 120.

The present invention incorporates the use of at least two light sources. Each light source may be independent of the other, or may be integrated with one another. At least one light source is a monochromatic light source. Preferably, at least one light source is an amber light source. In one embodiment, for example, the first light source is a light-emitting diode (LED) light source, such as an amber LED light source. More specifically, the first light source may produce monochromatic light with a peak wavelength of about 580 nm or above, or between about 580 nm and about 660 nm, or between about 580 nm and about 600 nm. In another embodiment, the first light source may be a low-pressure sodium light source.

Figure 4A:
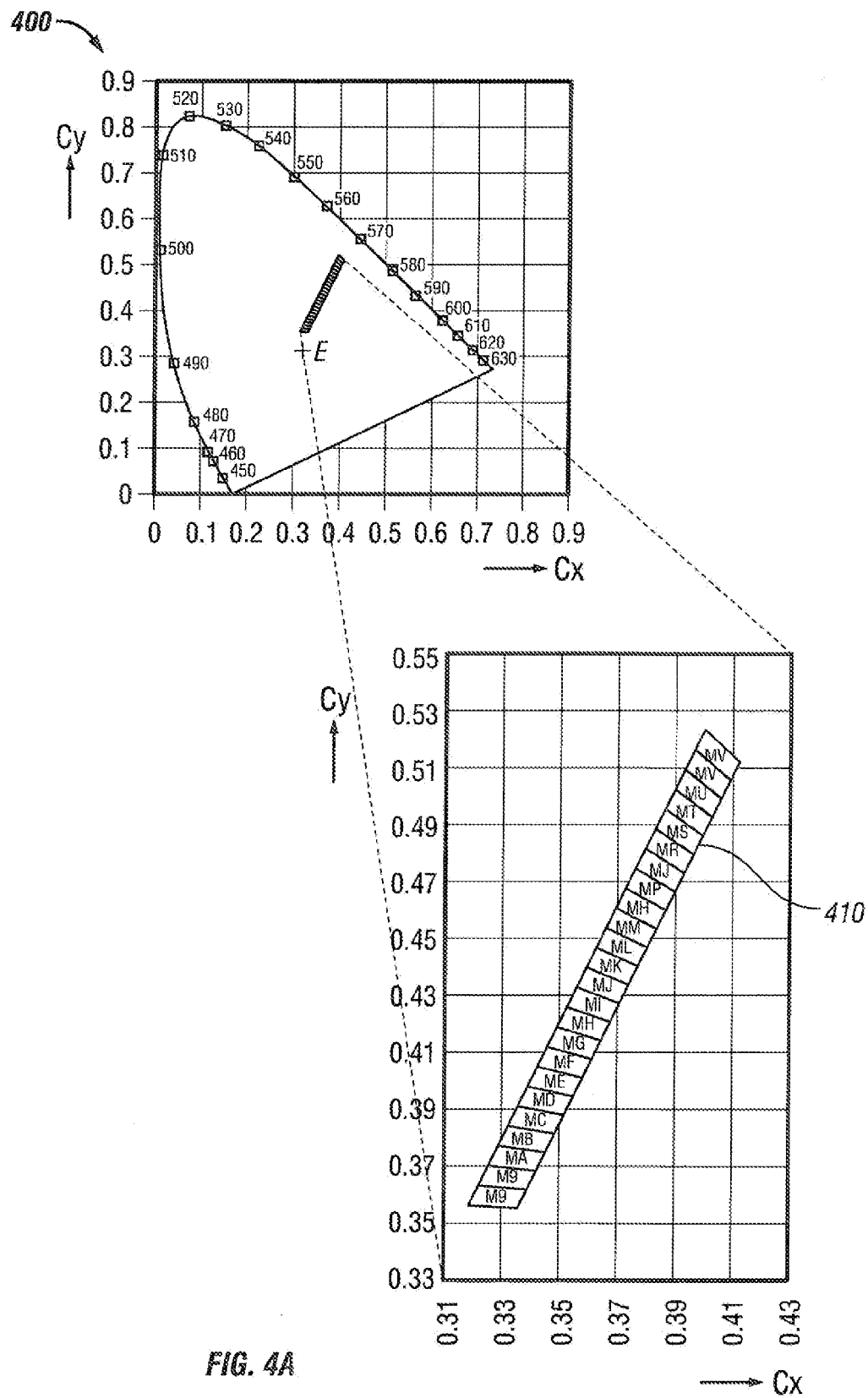
FIGS. 4A and 4B provides chromaticity diagrams to explain an aspect of the present invention.
Figure 4B:
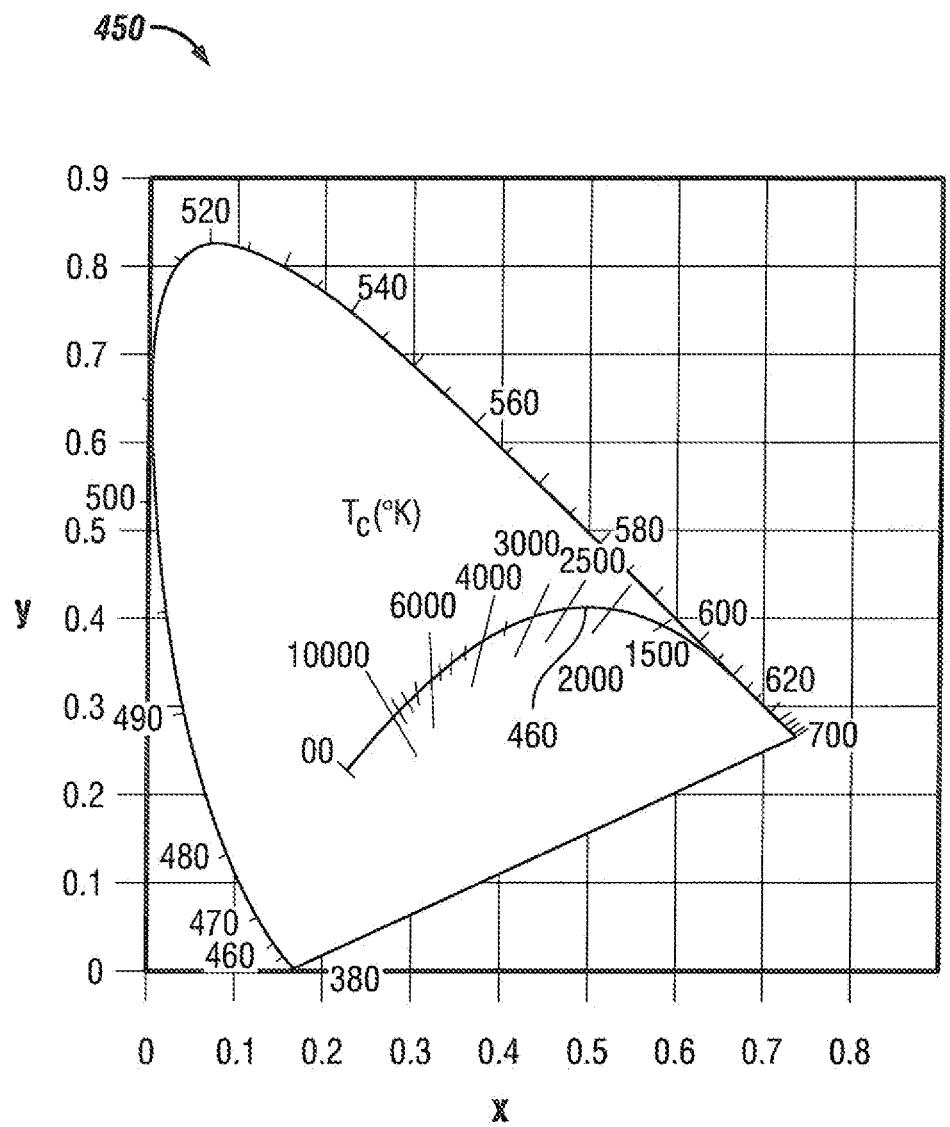

At least one other light source (i.e., a second light source) is a polychromatic light source. Preferably, the second light source is a green-tint white LED light source, which when combined with the first light source produces a resulting white light with a color rendering index above 75. In one embodiment, for example, the second light source includes one or more LED chips selected from one of the bins 410 provided in the chromaticity diagram of FIG. 4A. As would be understood by one of skill in the art, the LED chips are chosen based on the color coordinates of the monochromatic light source. Both light sources should combine to produce a light that matches the black body curve 460 provided in chromaticity diagram 450 of FIG. 46. The intensities of the first and/or second light sources can also be configured to produce a resulting light on the black body curve 460.

In another embodiment, wherein the second light source is used to replace (rather than supplement) the first light source, the second light source is a polychromatic LED light source producing a white light with a color rendering index above 75.

Controller 118 is a general purpose processor that receives input from imaging system 116, auxiliary control 112, and/or communications module 114. Controller 118 includes programmed instructions to control the illumination of one or more light sources 120. For example, in one embodiment, controller 118 is programmed and configured to illuminate the first light source in a standby operational mode, and illuminate both the first light source and the second light source when imaging system 116 detects a target within illumination area 180. The combination of the first and second light source results in a white light having a color rendering index above 75. Controller 118, and equivalent systems, thus serve as a means for illuminating a monochromatic light during a standby operational mode, and illuminating both a monochromatic light and a polychromatic light when an imaging system detects a target within an illumination area.

In one embodiment, controller 118 is also programmed and configured to illuminate the first light source in a standby operational mode and maintain the second light source unilluminated, despite the imaging system detecting a target, during an environmentally critical time period. As such, lighting system 100 may sacrifice color rendering during environmentally critical time periods to minimize spectral pollution. Environmentally critical time periods include, but are not limited to, sea turtle breeding periods, bird migration periods, plant growth periods, plant activity cycles, etc.

In another embodiment, controller 118 is programmed and configured to illuminate both the first light source and the second light source in response to a command received from auxiliary control 112 and/or communications module 114. For example, local authorities may transmit a command to communications module 114 to illuminate the second light source during a security emergency. Communications module 114 may be a wireless transducer, or a land-line connection. Further, auxiliary control 112 may be the control logic that provides controller 118 with information regarding environmentally critical time periods. Auxiliary control 112 and/ or communications module 114, and equivalent systems, serve as means for providing an external command to the means for illuminating.

Further, in an embodiment wherein the second light source itself produces a white light with a color rendering index about 75, controller 118 may be configured to switch between the first and second light source depending on lighting need.

In operation, imaging system 116 provides an input to controller 118. Imaging system 116 may include a charge-coupled device (CCD) camera, complimentary metal-oxide semiconductor (CMOS) image sensor, and/or other motion sensor and identification systems. In one embodiment, imaging system 116 is a chip-based imaging system having a processor with control logic to identify and differentiate objects within its viewing window. Such imaging systems are commercially available, such as the Intelligent Occupancy Sensing system and Machine Vision Camera system provided by TEXAS INSTRUMENTS, Inc. For example, imaging system 116 preferably includes recognition logic to differentiate between targets (e.g., humans or vehicles) and non-target moving objects and/or animals. As such, if imaging system 116 identifies an animal moving within the illumination area 180, imaging system 116 can provide an input (or no input at all) to control system 118 indicating that control system 118 should remain in the standby operational mode. While in standby operational mode, the lighting system compromises color rendering to minimize spectral pollution. However, if imaging system 116 identifies a target within illumination area 180, imaging system 116 may provide an input to control system 118 indicating that one or more additional polychromatic light sources should be illuminated to replace or supplement the first monochromatic light source. Imaging system 116, and equivalent systems, thus serve as "means for distinguishing between targets and other non-target moving objects," and "means for distinguishing between a target of interest and a target not-of-interest."

Figure 2:
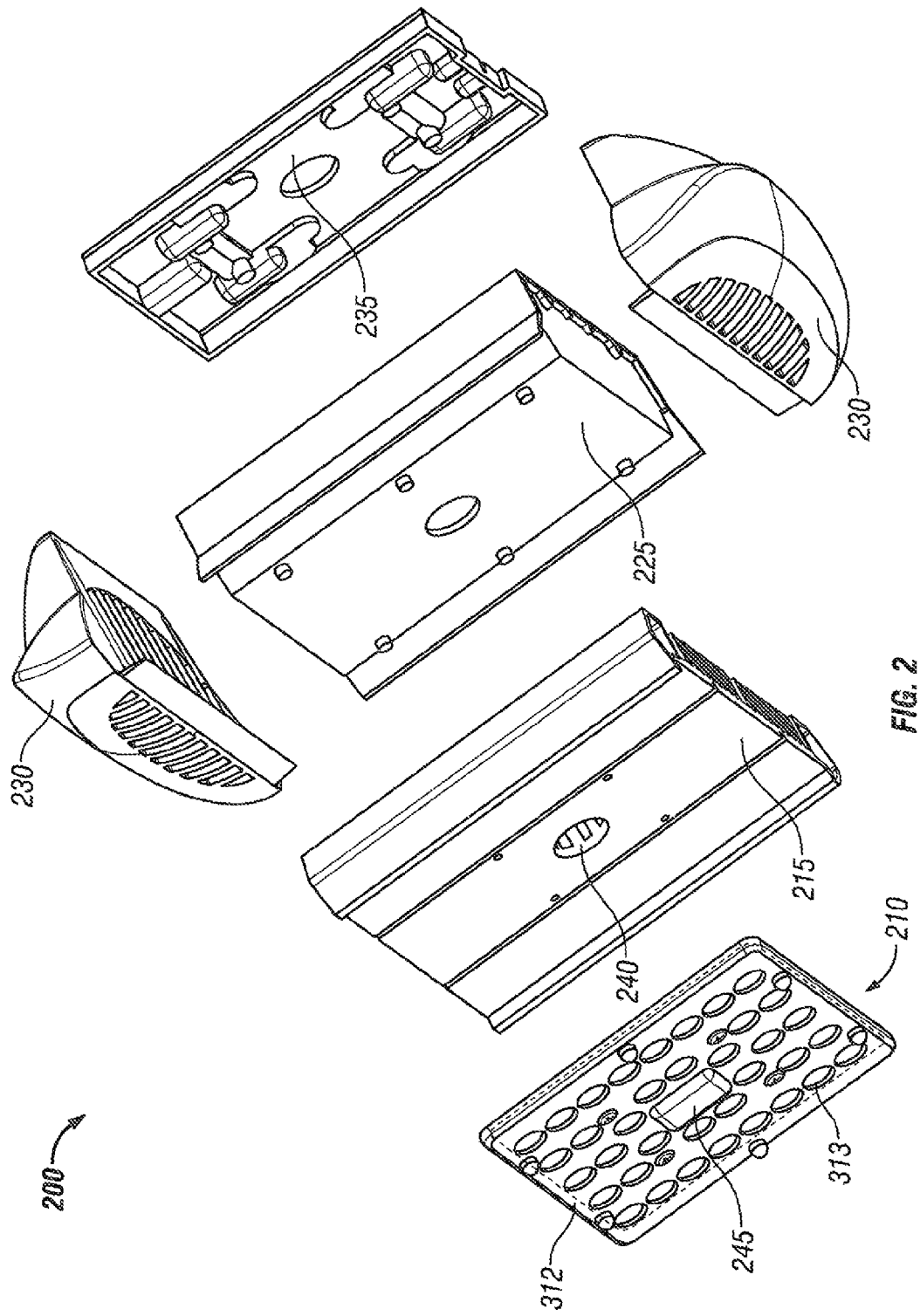
FIG. 2 is an exploded view of an embodiment of the present invention.
Figure 3:
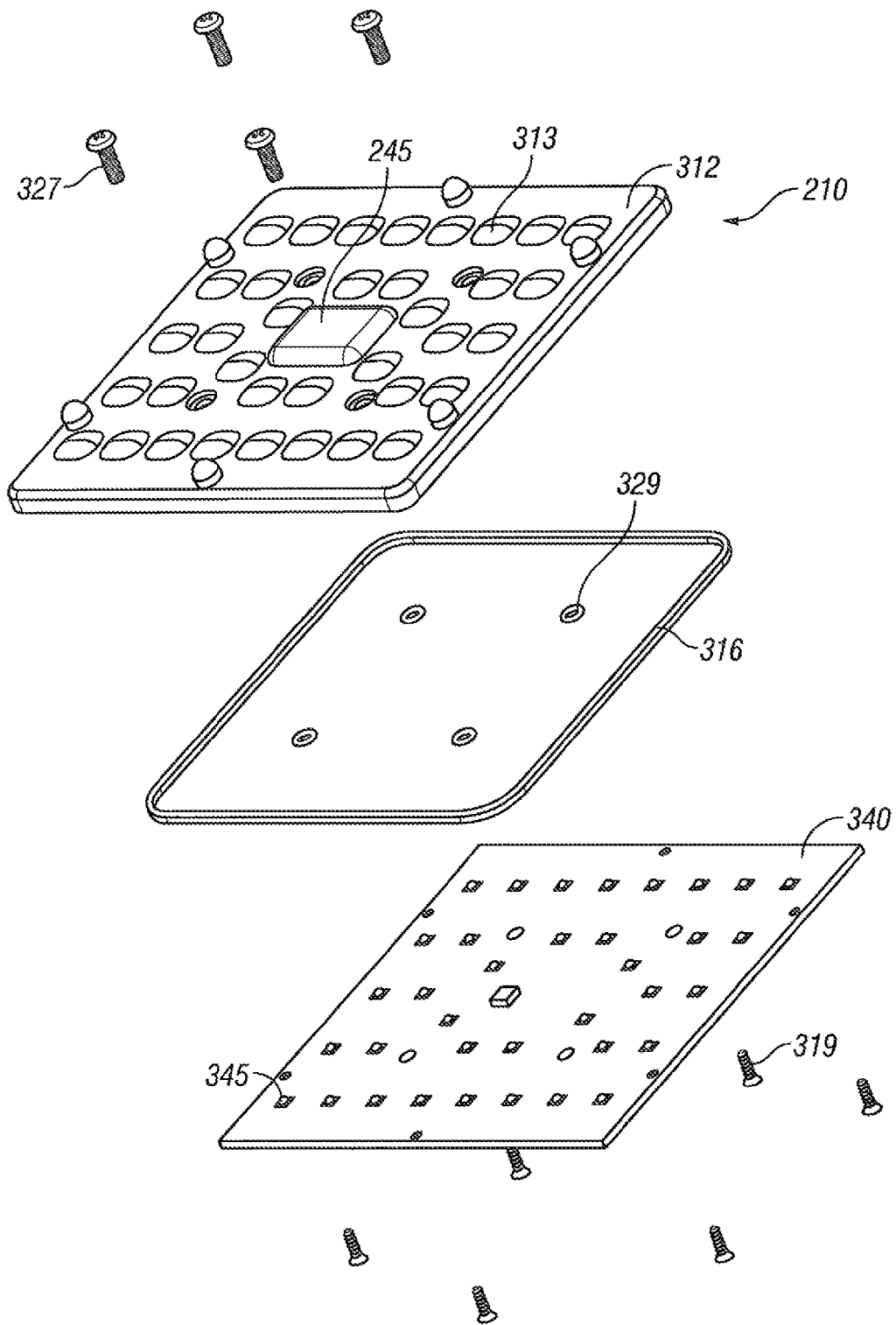
FIG. 3 is an exploded view of the light source front end presented in FIG. 2.

FIG. 2 is an exploded view of an embodiment of the present invention. FIG. 2 illustrates a lighting module 200 having a light source front end 210. FIG. 3 is an exploded view of light source front end 210. In the embodiment shown, light source front end 210 includes a directional optic 312 and an LED board 340. LED board 340 includes a plurality of LED packages 345. A gasket 316 is provided between directional optic 312 and LED board 340. Fasteners 319 are used to attach directional optic 312 to LED board 340.

Each LED package 345 may consist of one or more LED dies emitting a particular wavelength of light. As such, each LED package 345 may be considered its own distinct light source. Alternatively, one or more LED packages producing similar wavelengths of light may be linked or grouped together to form a single light source. For example, a plurality of LED packages 345, each producing amber light, may be linked together to function as one amber light source (i.e., a first light source). Similarly, a plurality of LED packages 345, each producing a green-tint white light, may be linked together to function as one polychromatic light source (i.e., a second light source). The "first light source" and "second light source" are then controlled by a controller, as discussed above. The LED packages of the first light source may be either intermixed or spatially separated from LED packages of the second light source on the LED board 340.

Directional optic 312 includes a plurality of directional lenses 313. Each directional lens is shaped and configured to direct light in a desired direction. Directional optic 312 also includes an imaging system 245, such as one of the imaging systems described above.

Lighting module 200 is provided with a component housing 225. Within component housing 225 are one or more electrical components; such as, LED drivers, processors, and other components described with respect to block 102 of FIG. 1. Lighting module 200 further includes a heat sink 215 and heat sink end caps 230, which are provided to dissipate heat from LED board 340. Fasteners 327 and washers 329 are used to couple LED hoard 340 to heat sink 215. An opening 240 is provided within heat sink 215 to accommodate for the electrical coupling between LED board 340 and the controller provided in component housing 225. Opening 240 also accommodates for the coupling of imaging system 245 with internal components within component housing 225. In alternative embodiments, the imaging system processor may be provided in component housing 225 or directly on LED board 340. Finally, a fixture mount 235 is provided to mount lighting module 200 to a lighting fixture.

Figure 5:
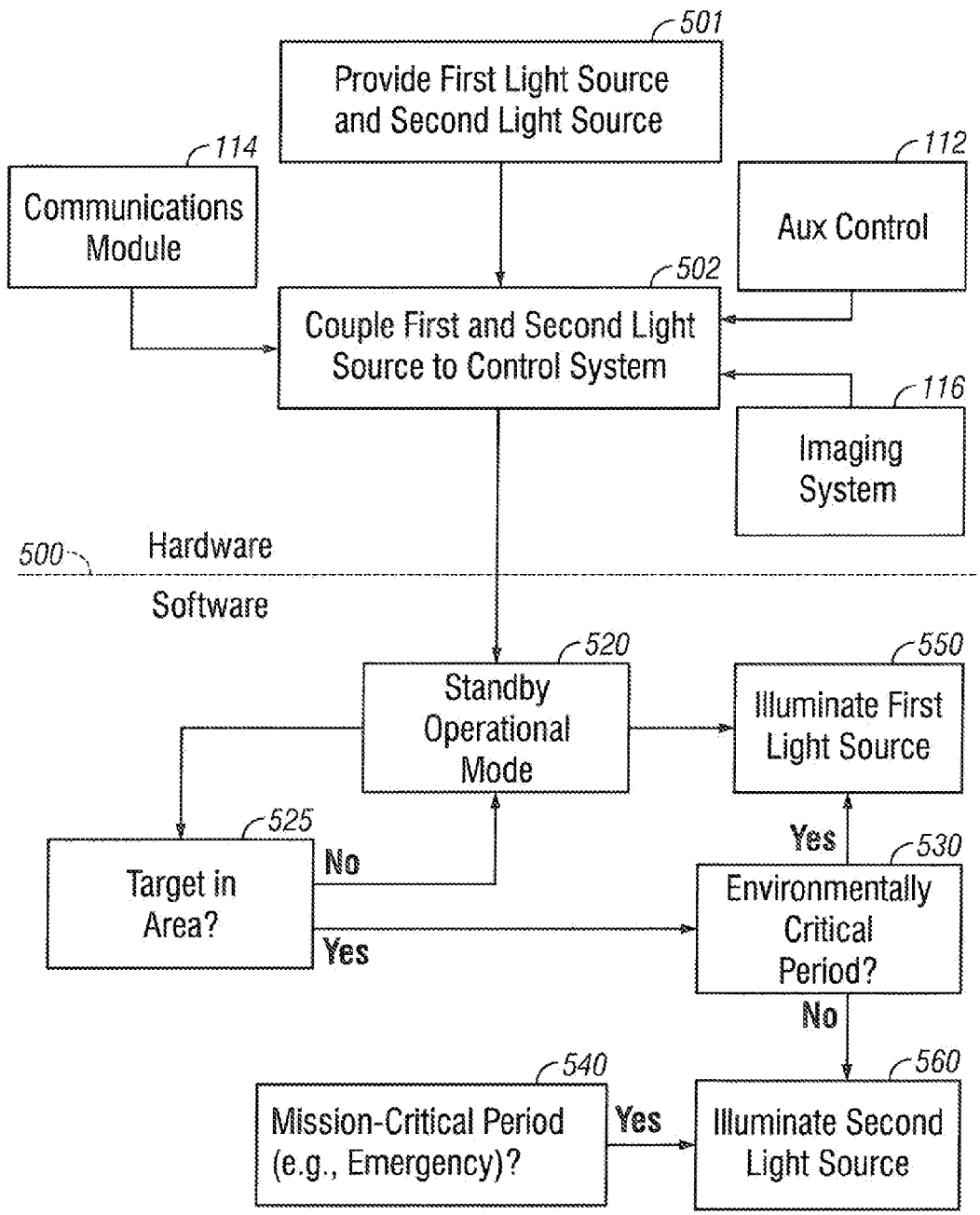
FIG. 5 is a flowchart illustrating an embodiment presented herein.

FIG. 5 is a flowchart illustrating a method of providing outdoor lighting, while minimizing spectral pollution. Dotted line 500 distinguishes between hardware components and software components of the presented embodiment. In step 501, there is provided a first light source and a second light source. In one embodiment, for example, the first light source is a monochromatic light source producing light with a peak wavelength of about 580 nm or above. The second light source is a polychromatic LED light source producing a green-tint white light. In step 502, the first and second light sources are coupled to a control system, such as controller 118 described above. Input to controller 118 is provided by AUX control 112, communications module 114, and imaging system 116. The control system is then programmed according to the software protocol provided below dotted line 500. For example, the control system is initially set in a standby operational mode (block 520). While in standby operational mode (block 520), the control system illuminates the first light source (block 550). The first light source, which is a monochromatic light source producing light with a peak wavelength of about 580 nm or above, compromises color rendering in order to minimize spectral pollution.

When a target enters the illumination area (block 525), the control system determines whether there is an environmentally critical time period (block 530). If there is an environmentally critical time period, the control system maintains the first light source illuminated (block 550) and the second light source un-illuminated, whether or not a target is within the illumination area. As such, the lighting system minimizes spectral pollution during environmentally critical time periods. However, if there is not an environmentally critical time period, then control system illuminates the second light source (block 560) to supplement the first light source. As such, the combined first and second light source provide improved color rendering and viewing conditions. At the same time, if there is a command for mission-critical lighting, such as a security emergency, the control system can maintain the second light source illuminated (block 560), regardless of whether there is a target in the illumination area or whether there is an environmentally critical period.

As such, there is provided an outdoor lighting system that can accommodate for various lighting needs and circumstances, and minimize spectral pollution. In typical operation, the outdoor lighting system provides a monochromatic light that minimizes spectral pollution and environmental impact. The control system includes an integrated imaging system that can, distinguish between targets (e.g., humans or vehicles) and other non-target moving objects and/or animals. If non-target moving objects and/or animals enter the illumination area, the light system can continue to provide monochromatic light with minimal spectral pollution. However, if a target (e.g., human or vehicles) enters the illumination area, or an emergency situation is identified, the control system can supplement or replace the monochromatic light with a high color rendering, polychromatic light.

EXAMPLES

The following paragraphs serve as example embodiments of the above-described methods and systems. The examples provided are prophetic examples, unless explicitly stated otherwise.

Example 1

In one example, there is provided a method of providing outdoor lighting while minimizing spectral pollution, comprising: 1) providing a first light source and a second light source; 2) electrically coupling the first light source and the second light source to a control system, wherein the control system is integrated with an imaging system; 3) programming the control system to illuminate the first light source in a standby operational mode; and 4) programming the control system to illuminate both the first light source and the second light source when the imaging system detects a target within an illumination area. In such example, the first light source is a monochromatic light source producing light with a peak wavelength of about 580 nm or above. The second light source is a polychromatic LED light source producing a green-tint white light. Illumination of both the first light source and the second light source produces a white light with a color rendering index of about 75 or above.

The imaging system may include a processor having image-recognition logic to differentiate between a target (e.g., human or moving vehicle) and non-target moving objects. The imaging system may also include a CCD camera, a CMOS sensor, and/or alternative motion detector.

The method may also include any one of the following steps: 1) programming the control system to illuminate the first light source in a standby operational mode and maintain the second light source un-illuminated, despite the imaging system detecting a target, during an environmentally critical time period, wherein the environmentally critical time period corresponds to sea turtle breeding periods or bird migrations; 2) coupling the control system to a communications module; 3) programming the control system to illuminate both the first light source and the second light source in response to a command received from the communications module; and 4) transmitting a command to the communications module to illuminate the second light source during a security emergency. The communications module may be a wireless transducer.

The first light source may be an LED light source, a low-pressure sodium light source, an amber light source, or any other light source that produces monochromatic light with a peak wavelength between about 580 nm and about 660 nm, or between about 580 nm and about 600 nm.

Example 2

In another example, there is provided an outdoor lighting system, comprising: 1) a first light source that produces monochromatic light with a peak wavelength of about 580 nm or above; 2) a second light source, wherein the second light source is a polychromatic LED light source producing a green-tint white light, and wherein illumination of both the first light source and the second light source produces a white light with a color rendering index of about 75 or above; 3) a control system electrically coupled to the first light source and the second light source; and 4) an imaging system integrated with the control system and providing an input to the control system. The control system is programmed to illuminate the first light source in a standby operational mode, and illuminate both the first light source and the second light source when the imaging system detects a target within an illumination area.

The imaging system may include a processor having image-recognition logic to differentiate between a target (e.g., human or vehicle) and another non target moving object, as well as a CCD camera, a CMOS sensor, and/or motion detector, The system may also include a communications module coupled to the control system. The communications module provides external commands to the control system. The communications module may be a wireless transducer.

The first light source may be an LED light source, a low-pressure sodium light source, an amber light source, or any other light source that produces monochromatic light with a peak wavelength between about 580 nm and about 660 nm, or between about 580 nm and about 600 nm.

Example 3

In a third example, there is provided a method of providing environmentally sensitive outdoor lighting, comprising: 1) providing a first light source and a second light source on an outdoor fixture, wherein the first light source is a monochromatic light source producing light with a peak wavelength between about 580 nm and about 615 nm, and wherein the second light source is a polychromatic LED light source producing a green-tint white light; 2) electrically coupling the first light source and the second light source to a control system, wherein the control system is integrated with an imaging system, wherein the imaging system comprises a processor having image-recognition logic to differentiate between a target (e.g., human or vehicle) and another non-target moving object; 3) programming the control system to illuminate the first light source in a standby operational mode; and 4) programming the control system to illuminate both the first light source and the second light source when the imaging system detects a target within an illumination area, wherein illumination of both the first light source and the second light source produces a white light with a color rendering index of about 75 or above. The method may further include the steps of: 5) programming the control system to illuminate the first light source in a standby operational mode and maintain the second light source un-illuminated, despite the imaging system detecting a target, during an environmentally critical time period: 6) coupling the control system to a communications module; 7) programming the control system to illuminate both the first light source and the second light source in response to a command received from the communications module; and 8) transmitting a command to the communications module to illuminate the second light source during a security emergency.

Example 4

In a fourth example, there is provided an environmentally sensitive outdoor lighting system, comprising: 1) a first light source that produces monochromatic light with a peak wavelength between about 580 nm and about 615 nm; 2) a second light source, wherein the second light source is a polychromatic LED light source producing a green-tint white light, and wherein illumination of both the first light source and the second light source produces a white light with a color rendering index of about 75 or above; 3) a control system electrically coupled to the first light source and the second light source: 4) an imaging system integrated with the control system and providing an input to the control system, wherein the imaging system comprises a processor having image-recognition logic to differentiate between a target (e.g., human or vehicle) and another non-target moving object; and 5) a communications module coupled to the control system, wherein the communications module provides external commands to the control system. The control system is programmed to illuminate the first light source in a standby operational mode, and illuminate both the first light source and the second light source when the imaging system detects a target within an illumination area.

Example 5

In yet another example, there is provided a lighting system, comprising: means for producing monochromatic light with a peak wavelength between about 580 nm and about 615 nm; means for producing a polychromatic green-tint white light, wherein the combined monochromatic and polychromatic light have a color rendering index above about 80; means for differentiating between a target (e.g., human or vehicle) and another non-target moving object; means for illuminating the means for producing monochromatic light during a standby operational mode, and illuminating both the means for producing monochromatic light and the means for producing a polychromatic light when the means for differentiating detects a target within an illumination area; and means for providing an external command to the means for illuminating.

CONCLUSION

The foregoing description of the invention has been presented for purposes of illustration and description. It is not intended to be exhaustive or to limit the invention to the precise form disclosed. Other modifications and variations may be possible in light of the above teachings. The embodiments were chosen and described in order to best explain the principles of the invention and its practical application, and to thereby enable others skilled in the art to best utilize the invention in various embodiments and various modifications as are suited to the particular use contemplated. It is intended that the appended claims be construed to include other alternative embodiments of the invention; including equivalent structures, components, methods, and means.

It is to be appreciated that the Detailed Description section, and not the Brief Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. An environmentally sensitive outdoor lighting system comprising:
    a first light source that produces monochromatic light;
    a second light source that produces a polychromatic white light;
    a control system electrically coupled to the first light source and the second light source; and
    an imaging systems integrated with the control system and providing an input to the control system;
    wherein the imaging system comprises a processor having image-recognition logic to differentiate between a target and another non-target moving object;
    wherein the control system is programmed to illuminate the first light source in a standby operational mode, and illuminate the second light source when the imaging system detects a target within an illumination area.

2. The outdoor lighting system according to claim 1 wherein the second light source produces light with a color rendering index of 75 or above.

3. The outdoor lighting system according to claim 1 wherein the first light source has a peak wavelength above 580 nm.

4. The outdoor lighting system according to claim 1 wherein the first light source produces lighting with a peak wavelength within one of the ranges selected from the group consisting of: from 580 nm to 660 nm, from 580 nm to 615 nm, and from 580 nm to 600 nm.

5. The outdoor lighting system according to claim 1 wherein the first light source is selected from the group consisting of: an LED light source, a low-pressure sodium light source, and an amber light source.

6. The outdoor lighting system according to claim 1 wherein the second light source produces a polychromatic green-tint white light.

7. The outdoor lighting system according to claim 1 wherein the imaging system comprises at least one of a CCD camera and a CMOS image sensor.

8. The outdoor lighting system according to claim 1 wherein the control system is programmed to illuminate the first light source in a standby operation mode and maintain the second light source un-illuminated, despite detecting a target, during an environmentally critical time period.

9. The outdoor lighting system according to claim 1 further comprising a communications module coupled to the control system; wherein the communication module provides external command to the control system.

10. A method of providing outdoor lighting while minimizing spectral pollution, comprising:
    programming the an imaging system to differentiate between a target and another non-target moving object;
    programming a control system that is associated with the imaging system to illuminate a first light source in a standby operational mode; and
    programming the control system to illuminate a second light source when the imaging system detects a target within an illumination area;
    wherein the first light source is a monochromatic light source producing light with a peak wavelength of 580 nm or above; and
    wherein the second light source is a polychromatic white light source.

11. The method according to claim 10 further comprising programming the control system to illuminate the first light source in a standby operation mode and maintain the second light source un-illuminated, despite the imaging system detecting a target, during an environmentally critical time period.

12. The method according to claim 11 wherein the environmentally critical time period is selected from the group consisting of: sea turtle breeding periods, bird migration periods, plant growth periods, and plant activity cycles.

13. The method according to claim 10 further comprising:
    coupling the control system to a communications module; and programming the control system to illuminate the second light source in response to a command received from the communications module.

14. The method according to claim 10 wherein the first light source is selected from the group consisting of: an LED light source, a low-pressure sodium light source, and an amber light source.

15. The method according to claim 10 wherein the first light source produces lighting with a peak wavelength within one of the ranges selected from the group consisting of: from 580 nm to 660 nm, from 580 nm to 615 nm, and from 580 nm to 600 nm.

16. An environmentally sensitive outdoor lighting system comprising:
    a first light source that produces monochromatic light having a peak wavelength above 580 nm;
    a second light source that produces a polychromatic white light;
    a control system electrically coupled to the first light source and the second light source; and
    an imaging system integrated with the control system and providing an input to the control system, wherein the imaging system comprises a processor having image-recognition logic to differentiate between a target and another non-target moving object;
    wherein the control system is programmed to illuminate the first light source in a standby operational mode, and illuminate the second light source when the imaging system detects a target within an illumination area; and
    wherein the second light source produces light with a color rendering index of 75 or above.

17. The outdoor lighting system according to claim 16 wherein the first light source produces lighting with a peak wavelength within one of the ranges selected from the group consisting of: from 580 nm to 660 nm, from 580 nm to 615 nm, and from 580 nm to 600 nm.

18. The outdoor lighting system according to claim 16 wherein the imaging system comprises at least one of a CCD camera and a CMOS image sensor, 19. The outdoor lighting system according to claim 16 wherein the control system is programmed to illuminate the first light source in a standby operation mode and maintain the second light source un-illuminated, despite detecting a target, during an environmentally critical time period.

20. The outdoor lighting system according to claim 16 further comprising a communications module coupled to the control system; wherein the communication module provides external command to the control system.

* * * * *